(12) United States Patent
Wu

(10) Patent No.: US 7,747,299 B2
(45) Date of Patent: Jun. 29, 2010

(54) SLIDING MECHANISM FOR SLIDE-TYPE PORTABLE ELECTRONIC DEVICE

(75) Inventor: Chen-Hui Wu, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 629 days.

(21) Appl. No.: 11/653,824

(22) Filed: Jan. 12, 2007

(65) Prior Publication Data

US 2008/0005867 A1 Jan. 10, 2008

(30) Foreign Application Priority Data

Jul. 7, 2006 (CN) .......................... 2006 1 0061563

(51) Int. Cl.
*H04M 1/00* (2006.01)
(52) U.S. Cl. ................. 455/575.4; 455/575.1; 361/727; 361/814
(58) Field of Classification Search ............. 455/575.1, 455/575.4; 361/727, 814
See application file for complete search history.

(56) References Cited

U.S. PATENT DOCUMENTS

| 7,436,653 | B2 * | 10/2008 | Yang et al. ............. 361/679.01 |
| 2005/0113154 | A1 * | 5/2005 | Park et al. ................ 455/575.4 |
| 2005/0122669 | A1 * | 6/2005 | Lee ............................. 361/679 |
| 2005/0181843 | A1 * | 8/2005 | Tsujimoto ................ 455/575.1 |
| 2006/0135229 | A1 * | 6/2006 | Kwak et al. ............. 455/575.4 |

* cited by examiner

*Primary Examiner*—Jean A Gelin
*Assistant Examiner*—Mong-Thuy Tran
(74) *Attorney, Agent, or Firm*—Jeffrey T. Knapp

(57) ABSTRACT

A sliding mechanism (100) for a portable electronic device (500) includes a first sliding member (10), a second sliding member (20), at least one cushion (30), and at least one elastic member (40). The first sliding member has a first body (11). At least one guiding rail (12) is formed on the first body. The second sliding member has a second body (21). At least one guiding arm (22) is formed on the second body. The cushion has a main body (31). The main body defines a receiving slot (314) therein. The guiding rail is configured for reception in the receiving slot. The cushion and the elastic member are sandwiched between the guiding rail and the guiding arm.

20 Claims, 7 Drawing Sheets

SLIDING MECHANISM FOR SLIDE-TYPE PORTABLE ELECTRONIC DEVICE

CROSS-REFERENCE TO RELATED APPLICATION

This application is related to a co-pending U.S. patent application Ser. No. 11/653,828, entitled "SLIDING MECHANISM FOR SLIDE-TYPE PORTABLE ELECTRONIC DEVICE", by Huang et al. Said application has the same assignee as the present application and is concurrently filed herewith. The disclosure of the above-identified application is incorporated herein by reference.

BACKGROUND OF THE INVENTION

1. Field of the Invention

The present invention generally relates to sliding mechanisms for slidably connecting two members and, more particularly, to a sliding mechanism configured (i.e., structured and arranged) for use in a slide-type portable electronic device to slidably interconnect two cases of the device.

2. Description of Related Art

Recently slide-type portable electronic devices have become increasingly popular. A typical slide-type portable electronic device has two housings, one of the housings slides over the other housing, thereby opening/closing the portable electronic device by means of a sliding mechanism.

A typical sliding mechanism includes two guiding rails symmetrically formed on two sides of one housing. The other housing has two guiding arms formed at two sides thereof. Each guiding arm defines a guiding slot therein. The guiding rails are configured for reception in the two guiding slots. Each guiding rail is slightly smaller than the size of the guiding slot, thus defining a small clearance between the guiding rail and the guiding arm. The guiding rails are slidable in the guiding slots thus allowing one housing to slide relative to the other housing. However, the guiding rails and the guiding arms are likely to undergo wear and tear because of continual friction between them, and correspondingly the clearance may become wider and wider. Thus, the two housings may eventually not fit properly to each other. That is to say one housing may shake relative to the other housing.

Therefore, a new sliding mechanism for slide-type portable devices is desired in order to overcome the above-described shortcomings.

SUMMARY

In one embodiment thereof, a sliding mechanism for a portable electronic device includes a first sliding member, a second sliding member, at least one cushion, and at least one elastic member. The first sliding member has a first body. At least one guiding rail is formed on the first body. The second sliding member has a second body. At least one guiding arm is formed at the second body. The cushion has a main body. The main body defines a receiving slot therein. The guiding rail is configured for reception in the receiving slot. The cushion and the elastic member are sandwiched between the guiding rail and the guiding arm.

Other advantages and novel features of the embodiments will become more apparent from the following detailed description thereof when taken in conjunction with the accompanying drawings.

BRIEF DESCRIPTION OF THE DRAWINGS

Many aspects of the present sliding mechanism can be better understood with reference to the following drawings. The components in the drawings are not necessarily drawn to scale, the emphasis instead being placed upon clearly illustrating the principles of the sliding mechanism and its potential applications. Moreover, in the drawings like reference numerals designate corresponding parts throughout the several views.

DETAILED DESCRIPTION OF THE EMBODIMENTS

Figure 1:
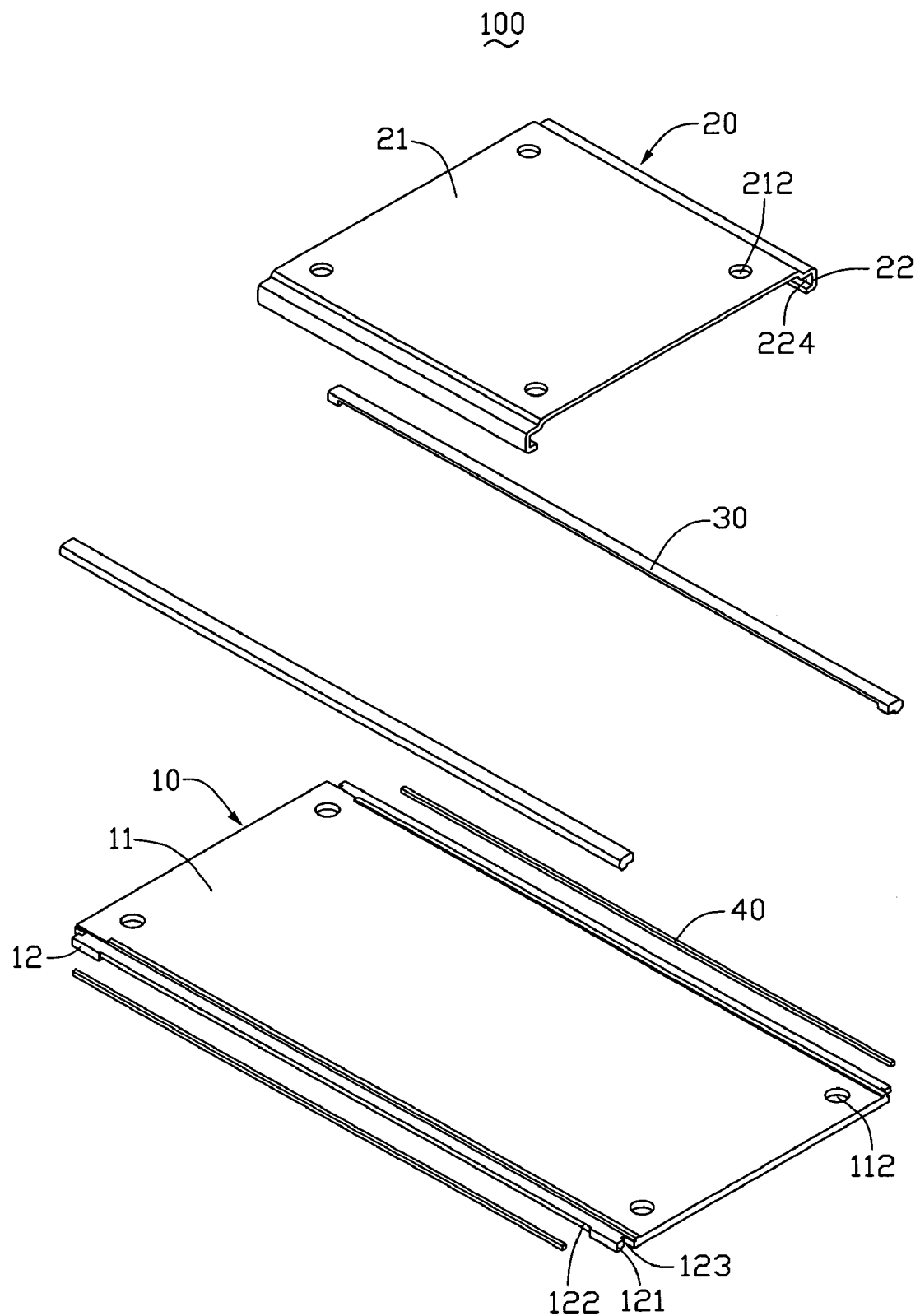
FIG. 1 is an exploded, isometric view of a sliding mechanism having two cushions in accordance with a first preferred embodiment.
Figure 7:
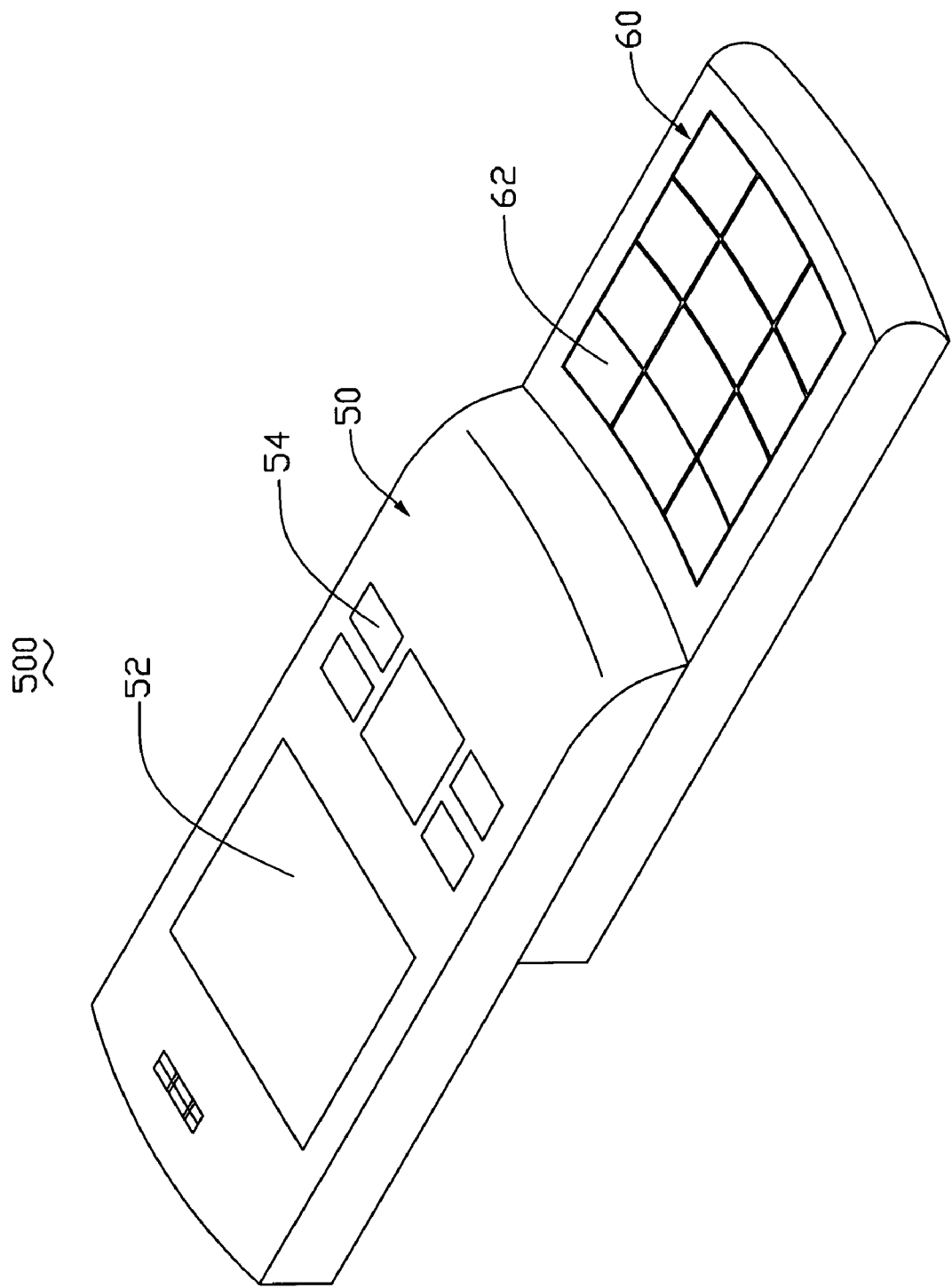
FIG. 7 is an isometric view of a portable electronic device equipped with the sliding mechanism in FIG. 1.

FIGS. 1 and 7 show a sliding mechanism 100 according to a first preferred embodiment. The sliding mechanism 100, in the illustrated embodiment, is used to interconnect a first case 50 and a second case 60 of a mobile phone 500. A keypad 62 is formed on a surface of the second case 60. A display 52 and a secondary keypad 54 are formed on a surface of the first case 50. The first case 50 is slidable relative to the second case 60 by means of the sliding mechanism 100. In an open position, the first case 50 slides away from the second case 60 allowing operation of the keypad 62. In a closed position, the first case 50 covers the keypad 62, thus protecting the keypad 62. While the sliding mechanism 100 is shown in use with the mobile phone 500, it is to be understood that the sliding mechanism 100 or obvious variations thereof may prove useful in other work environments (e.g., personal digital assistants) as well.

The sliding mechanism 100 includes a first sliding member 10, a second sliding member 20, at least one cushion 30, and at least one elastic member 40. In the illustrated embodiment there are two cushions 30 and two elastic members 40. The two cushions 30 and the two elastic members 40 are mounted to the first sliding member 10. The second sliding member 20 is slidable relative to the first sliding member 10.

The first sliding member 10 has a first body 11. The first body 11 is substantially a flat board in shape. Each corner of the first body 11 defines a first screw hole 112 therein. A guiding rail 12 is directly formed at each of two opposite sides of the first body 11. Each guiding rail 12 is substantially strip-shaped. Two projections 121 are respectively directly formed at two opposite ends of each guiding rail 12. The two projections 121 extend away from each other. The projection 121, the guiding rail 12, and the first body 11 cooperate to define a receiving groove 123. Each guiding rail 12 defines a receiving cutout 122 therein.

The second sliding member 20 has a second body 21. The second body 21 is a substantially flat board in shape. Each corner of the second body 21 defines a second screw hole 212 therein. A pair of guiding arms 22 are symmetrically and directly formed at two opposite sides of the second body 21. Each guiding arm 22 is substantially U-shaped and defines a guiding slot 224 therein. The two guiding slots 224 face towards each other.

Figure 2:
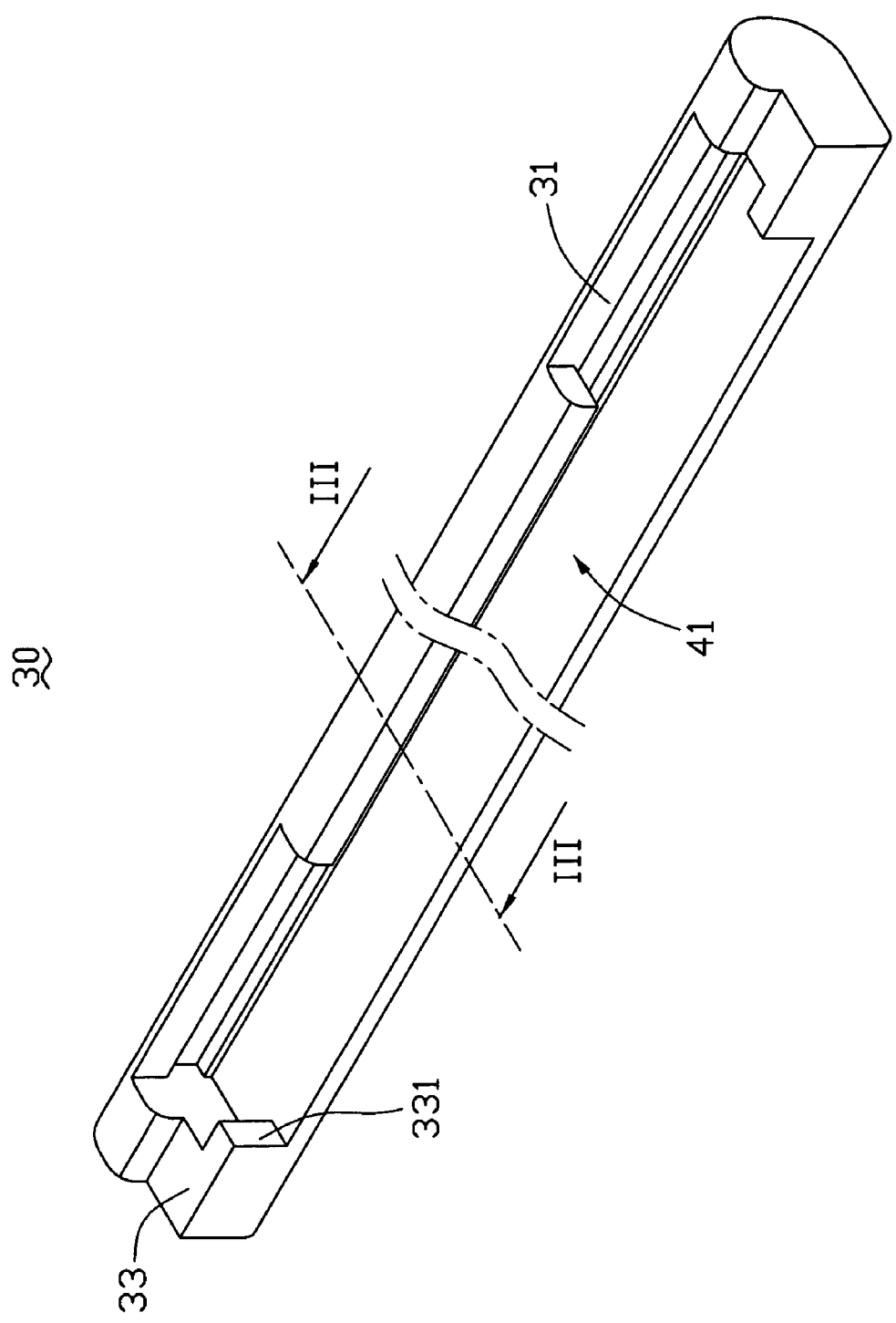
FIG. 2 is an isometric view of the cushion in FIG. 1.
Figure 3:
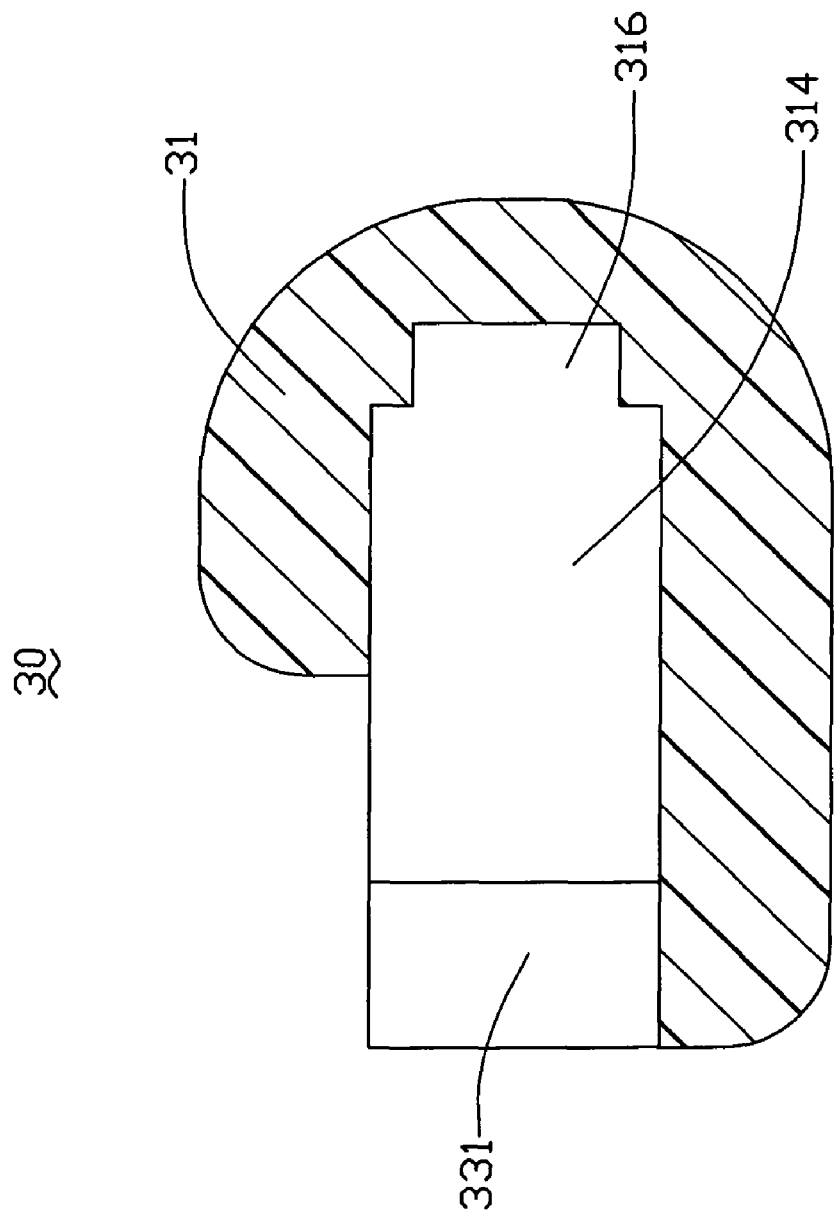
FIG. 3 is an isometric, cut-away view of the cushion along line III-III in FIG. 2.

Also further referring to FIGS. 2-3 as well as FIG. 1, the cushion 30 is advantageously made from plastic and has a main body 31. The main body 31 is a substantially deformed strip in shape and is configured for reception in a corresponding guiding slot 224 of the second sliding member 20. The main body 31 defines a first receiving slot 314 and a second receiving slot 316 therein. The first receiving slot 314 communicates with the second receiving slot 316. The guiding rail 12 of the first sliding member 10 is configured for reception in a corresponding first receiving slot 314. A block 33 is directly formed at each end of the main body 31. A protrusion 331 extends from an outer distal end of each block 33. The two protrusions 331 extend towards each other. The protrusion 331 is configured for reception in a corresponding receiving groove 123 of the first sliding member 10 thereby allowing the cushion 30 to be mounted to the first sliding member 10.

Each elastic member 40 is a substantially strip-shaped and is advantageously made from plastic. One end of the elastic member 40 is configured for reception in a corresponding second receiving slot 316. The other opposite end of the elastic member 40 is configured for reception in a corresponding receiving cutout 122 of the first sliding member 10.

Figure 4:
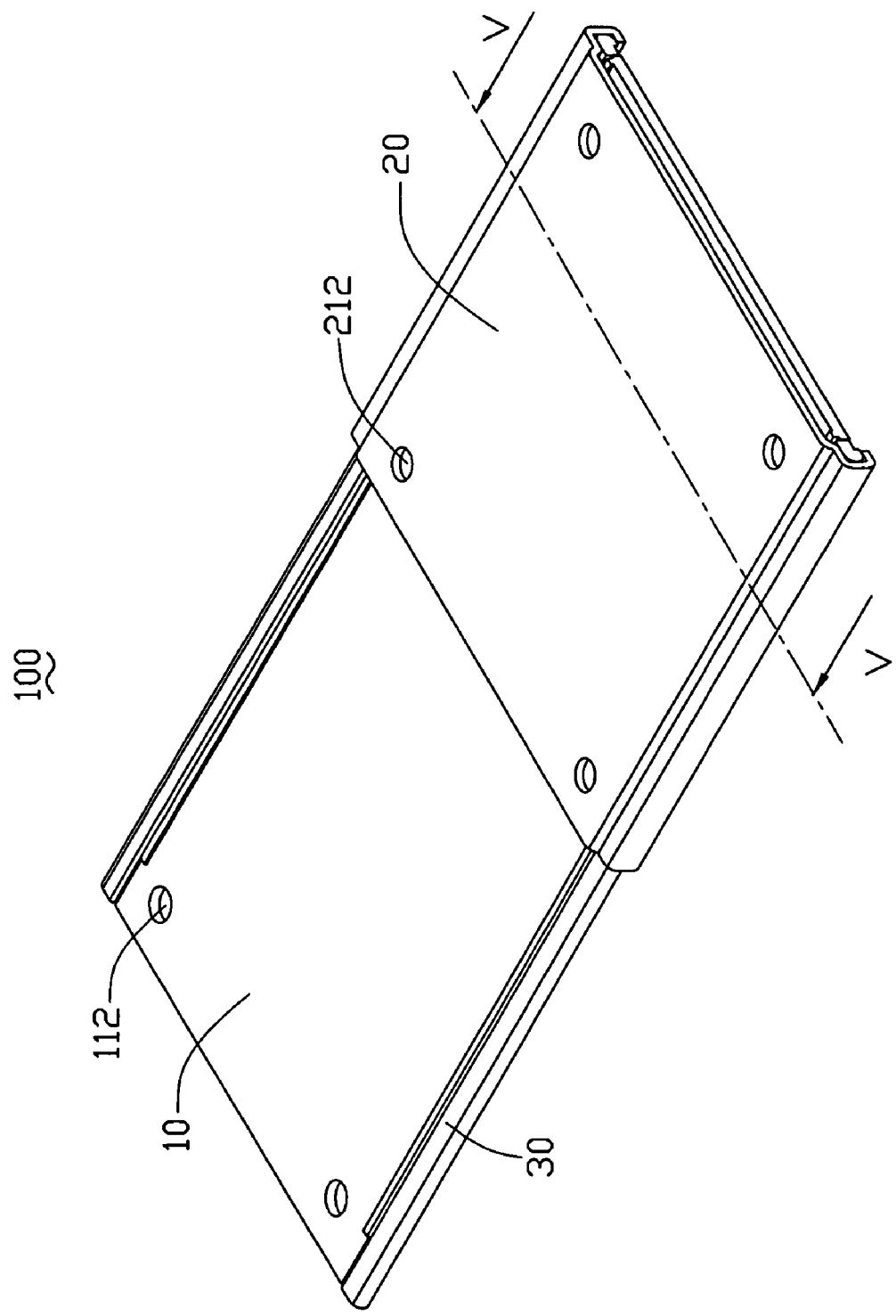
FIG. 4 is an assembled, isometric view of the cushion in FIG. 1.
Figure 5:
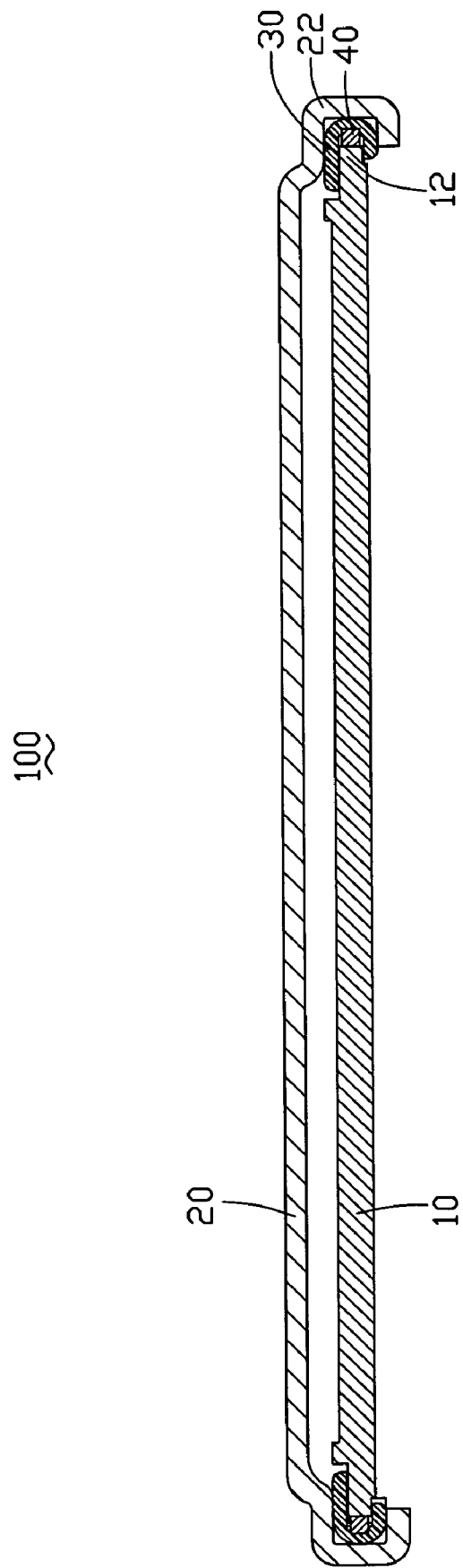
FIG. 5 is an isometric, cut-away view of the sliding mechanism along line V-V in FIG. 4.

In assembly, one end of each elastic member 40 is inserted into the second receiving slot 316 of a corresponding cushion 30. Each guiding rail 12 of the first sliding member 10 is inserted into the first receiving slot 314 of a corresponding cushion 30. The other opposite end of each elastic member 40 is received in a corresponding receiving cutout 122 of the first sliding member 10. Each protrusion 331 of the cushion 30 is engaged in the receiving groove 123 of the first sliding member 10. The assembled first sliding member 10, the cushions 30, and the elastic members 40 are mounted to the second sliding member 20 with each cushion 30 sliding into a corresponding guiding slot 224 of the second sliding member 20. Thus, the sliding mechanism 100 is completely assembled, as represented in FIGS. 4-5.

In use, the first sliding member 10 is mounted to the first case 50 of the mobile phone 500 by a bolt being screwed in each first screw hole 112. The second sliding member 20 is mounted to the second case 60 of the mobile phone 500 by a bolt being screwed in each second screw hole 212. The first case 50 is mounted to the second case 60 by the above-described assembling process. Thus, the first case 50 is slidable relative to the second case 60, thus allowing opening/closing of the mobile phone 500 by means of the sliding mechanism 100.

Figure 6:
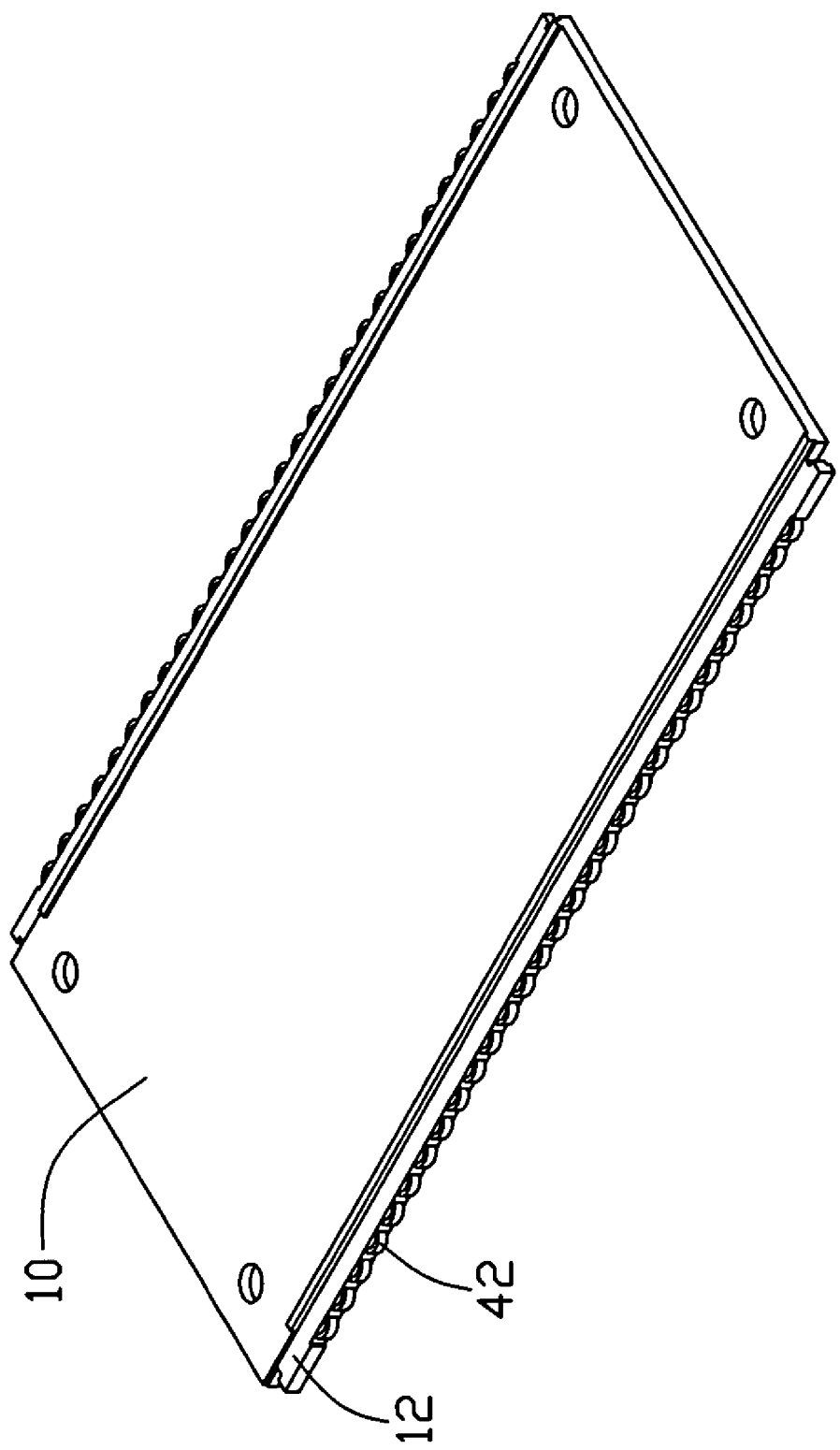
FIG. 6 is an isometric view of a first sliding member of a sliding mechanism in accordance with a second preferred embodiment.

Also referring to FIG. 6, in a second preferred embodiment, the elastic member 40 may be a plurality of slices 42. Each slice 42 is bent in a substantially semi-circular shape and is received in the receiving cutout 122. Two opposite ends of each slice 42 are formed on the guiding rail 12.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A sliding mechanism comprising:
   a first sliding member having a first body, at least one guiding rail being formed on the first body;
   a second sliding member having a second body, at least one guiding arm being formed on the second body, each of the at least one guiding arm defining a corresponding guiding slot;
   at least one cushion, each of which having a main body, the main body defining a receiving slot therein; and
   at least one elastic member, the guiding rail and the elastic member being secured in the receiving slot, and the cushion and the elastic member being sandwiched between the guiding rail and the guiding arm, the cushion and the elastic member extending above, enveloping the guiding rail, and separating the guiding rail completely from the guiding arm, and the cushion slidably received in the guiding slot.

2. The sliding mechanism as claimed in claim 1, wherein two projections are respectively formed at two opposite ends of the guiding rail, the projection, the guiding rail, and the first body cooperate to define a receiving groove, two blocks are respectively formed at two opposite ends of the main body, a protrusion extends from an outer distal end of each block, and the protrusion is configured for reception in a corresponding receiving groove, allowing the cushion to be mounted to the first sliding member.

3. The sliding mechanism as claimed in claim 1, wherein the cushion is made from plastic.

4. The sliding mechanism as claimed in claim 1, wherein the elastic member is a plastic strip.

5. The sliding mechanism as claimed in claim 1, wherein the elastic member includes a plurality of elastic slices formed on the guiding rail, and each slice is bent in a substantially semi-circular shape.

6. The sliding mechanism as claimed in claim 1, wherein the guiding rail is substantially strip-shaped.

7. The sliding mechanism as claimed in claim 1, wherein the guiding rail defines a receiving cutout for receiving one end of the elastic member.

8. The sliding mechanism as claimed in claim 1, wherein the guiding arm is substantially U-shaped and defines a guiding slot for receiving the cushion and the elastic member.

9. The sliding mechanism as claimed in claim 1, wherein the second body of the second sliding member has two guiding arms and defines two guiding slots, wherein the two guiding slots face towards each other.

10. A portable electronic device, comprising:
    a first case;
    a second case; and
    a sliding mechanism slidably interconnecting the first case and the second case, the sliding mechanism comprising:
    a first sliding member mounted to the first case, the first sliding member having a first body, at least one guiding rail being formed on the first body;
    a second sliding member mounted to the second case, the second sliding member having a second body, at least one guiding arm being formed at the second body, the guiding arm defining a guiding slot therein, and the guiding rail of the first sliding member being slidably received in the guiding slot;
    at least one cushion; and
    at least one elastic member, the cushion and the elastic member being sandwiched between the guiding rail and the guiding arm, the cushion and the elastic member extending above, enveloping the guiding rail, and separating the guiding rail completely from the guiding arm, and the cushion slidably received in the guiding slot.

11. The portable electronic device as claimed in claim 10, wherein the cushion has a main body, the main body defines a receiving slot therein, and the guiding rail is configured for reception in the receiving slot.

12. The portable electronic device as claimed in claim 11, wherein two projections are respectively formed at two opposite ends of the guiding rail, the projection, the guiding rail, and the first body cooperate to define a receiving groove, two blocks are respectively formed at two opposite ends of the main body, a protrusion extends from an outer distal end of each block, and the protrusion is configured for reception in a corresponding receiving groove, allowing the cushion to be mounted to the first sliding member.

13. The portable electronic device as claimed in claim 10, wherein the cushion is made from plastic.

14. The portable electronic device as claimed in claim 10, wherein the elastic member is a substantially plastic strip.

15. The portable electronic device as claimed in claim 10, wherein the elastic member includes a plurality of elastic slices formed on the guiding rail, and each slice is bent in a semi-circular shape.

16. The portable electronic device as claimed in claim 10, wherein the guiding rail defines a receiving cutout for receiving one end of the elastic member.

17. The portable electronic device as claimed in claim 10, wherein the guiding arm is substantially U-shaped and defines a guiding slot for receiving the cushion and the elastic member.

18. The portable electronic device as claimed in claim 10, wherein the second body of the second sliding member has two guiding arms and defines two guiding slots, the two guiding slots face towards each other.

19. A portable electronic device comprising:
a first case;
a second case;
a sliding mechanism slidably interconnecting the first case and the second case in a lengthwise direction, the sliding mechanism comprising:
a first sliding member fixed to the first case, the first sliding member having a first body, a pair of guiding rails extending from opposite lengthwise sides of the first body;
a second sliding member fixed to the second case, the second sliding member having a second body, a pair of guiding arms being formed at opposite lengthwise sides of the second body, the guiding arms defining a pair of guiding slots facing toward each other;
a pair of cushions being respectively fixedly attached to the guiding rails, and received in the guiding slots of the second sliding member in such a manner that the second sliding member is slidable along the cushions in the lengthwise direction and fixed in a lateral direction perpendicular to the lengthwise direction; and
a pair of elastic members each being compressed between a corresponding guiding rail and cushion in the lateral direction, the cushions and the elastic members extending above, enveloping the guiding rails, and separating the guiding rails completely from the guiding arms.

20. The portable electronic device as claimed in claim 19, wherein each of the cushions defines first and second receiving slots arranged in the lateral direction, each of the guiding rails being interferentially received in the first receiving slot and each of the elastic members being deformably received in the second receiving slot of the corresponding cushion.

\* \* \* \* \*